United States Patent [19]

Nagata

[11] Patent Number: 4,617,760
[45] Date of Patent: Oct. 21, 1986

[54] TABLE RECIPROCATING APPARATUS
[75] Inventor: Tetsuya Nagata, Narashino, Japan
[73] Assignee: Seiko Seiki Kabushiki Kaisha, Chiba, Japan
[21] Appl. No.: 704,383
[22] Filed: Feb. 22, 1985
[30] Foreign Application Priority Data Feb. 24, 1984 [JP] Japan .................. 59-25391[U]

[51] Int. Cl.$^4$ .................................. B24B 9/00
[52] U.S. Cl. ........................ 51/34 C; 51/34 K
[58] Field of Search ........... 51/34 R, 59 R, 57, 91 R, 51/165.89, 34 C, 34 K; 74/25, 55

[56] References Cited

U.S. PATENT DOCUMENTS 2,552,188  5/1951  Krause et al. ...................... 74/55
3,199,359  8/1965  Beezer .............................. 74/55

Primary Examiner—Frederick R. Schmidt
Assistant Examiner—Maurina Rachuba
Attorney, Agent, or Firm—Robert E. Burns; Emmanuel J. Lobato; Bruce L. Adams

[57] ABSTRACT

A table-reciprocating apparatus comprises a table disposed on a base for reciprocating movement in relation to the base, a shaft axially attached to the table, and a ring-like sliding member attached to the other end of the shaft for imparting reciprocating movement to the shaft. A drive shaft and a cam assembly are disposed between the drive shaft and the sliding member for controlling the reciprocating movement of the member. The cam assembly comprises an inner cam axially connected to the drive shaft. An outer cam disposed within the ring-like sliding member in co-planar relationship, a bearing interposed between the inner cam and the outer cam to transmit movement therebetween, and a needle bearing providing contact between the outer cam and the inner surface of the sliding member.

5 Claims, 5 Drawing Figures

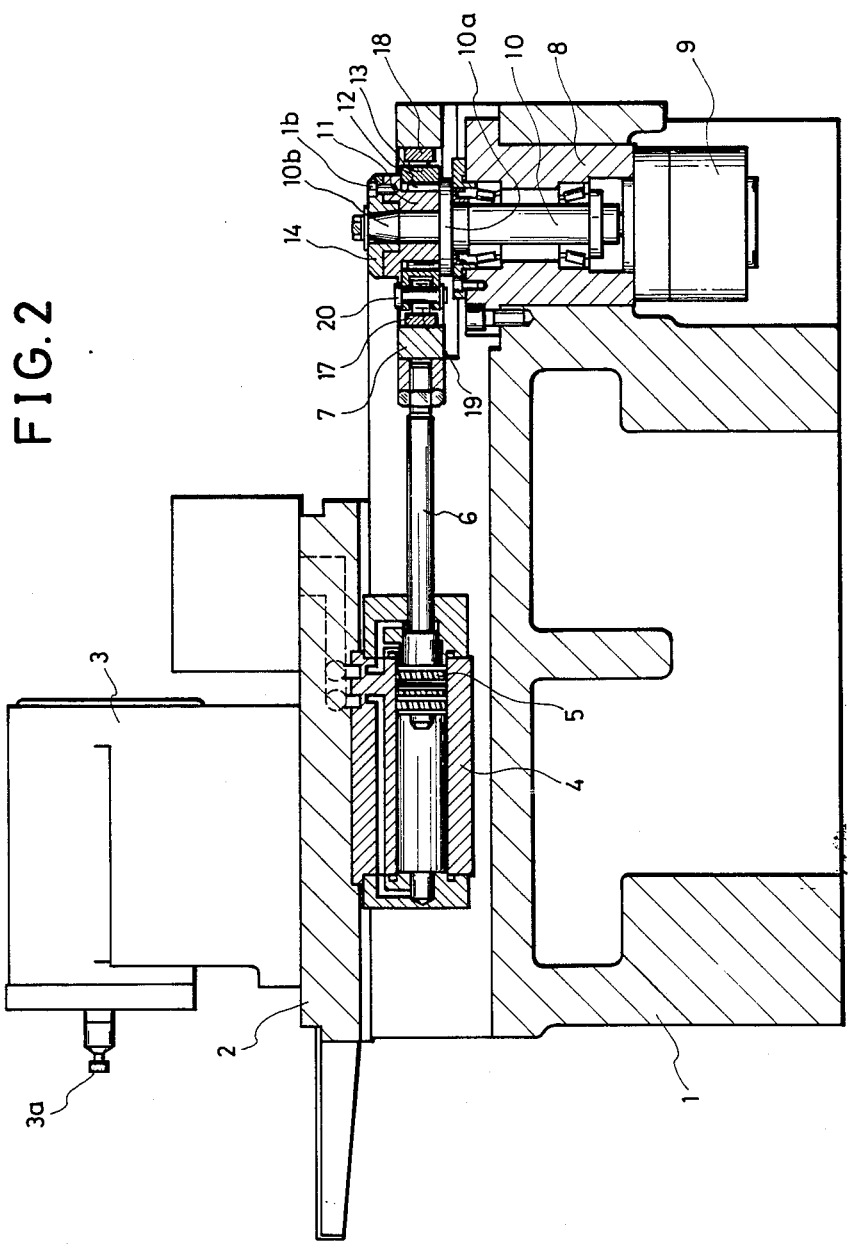

TABLE RECIPROCATING APPARATUS

This invention relates to a table reciprocating apparatus to effect reciprocating movement of a table or carriage plate such as used for a grinding maching.

BACKGROUND OF THE INVENTION

In a typical known embodiment, a hydraulic cylinder is attached to the under surface of the table of a grinding machine, and by operation of a hydraulic cylinder, the table can be rapidly moved to and fro between a retracted position and an operating position and for this purpose there is provided a rotationally driven eccentric cam mechanism or assembly which acts on the end of a reciprocating shaft which extends into a cylinder. Thus the grinding wheel can be driven with a reciprocating movement.

Such an eccentric cam mechanism is conventionally composed of a slide-ring which is attached to the reciprocating shaft and an eccentric cam is disposed within the slide-ring so that it is slidably in contact with the ring to move it in a forward and backward direction, and a drive shaft rotates the eccentric cam and when the drive shaft is rotated, the eccentric cam undergoes an eccentric movement and by slidably contacting the inside of the slide-ring, the slide-ring is moved in a reciprocating manner in accordance with the degree of eccentricity of the eccentric cam. Furthermore, the eccentric cam is formed as two rings and the outer cam ring contacts the inner wall of the slide-ring and the traverse force component is restrained as much as possible and it can be made to slide only along the axial direction of the shaft to be reciprocated.

In the conventional cam mechanism, however, as the outer cam reciprocates, it strikes the inner wall of the slide-ring, the reciprocating movement is not a smooth sine-curve in accordance with the degree of eccentricity and, as shown in FIG. 1, a shock which is indicated by dotted-line occurs at the end point of its reciprocating movement. In order to eliminate this shock, the gap between the surface of contact of the outer and the surface of contact of the slide-ring, must be extremely small in size, but in this case, as the contacting surfaces meet during each reciprocating movement, there is excessive wear.

OBJECT OF THE INVENTION

It is an object of the invention to eliminate the above-mentioned striking at the reciprocating end points, in a table reciprocating apparatus which is provided with a cam mechanism and to permit a smooth reciprocating movement following a smooth sine-curve.

SUMMARY OF THE INVENTION

In order to realize this object, this invention relates to a table-reciprocating apparatus which is provided with a table which is to be given a reciprocating movement which is removably disposed on a supporting bed, a reciprocatable shaft being axially secured to the table, a slide-ring secured to the other end of the shaft, an eccentric cam disposed in slide-ring and being slidably in contact with it in its forward and retracted position, and a drive shaft for rotation of the eccentric cam, the invention being characterized by the fact that the eccentric cam is composed of an inner cam which can be axially secured to the drive shaft and an outer cam which is engaged with a circumferential surface of the inner cam through a bearing and a needle-bearing is interposed for contact between the outer cam and the slide-ring.

BRIEF DESCRIPTION OF THE DRAWINGS

FIG. 2 is a side elevation, partly in cross-section, of an embodiment of this invention suitable for a table reciprocating apparatus for a grinding machine;

DESCRIPTION OF A PREFERRED EMBODIMENT

Figure 1:
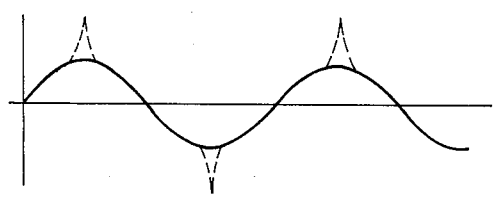
FIG. 1 is a graph illustrating the movement characteristic of a conventional table-reciprocating apparatus.

In the drawings, reference numeral 1 is a bed and reference numeral 2 is a grinding wheel table mounted on the bed 1 so as to be slidable to a forward and to a retracted position and on the upper portion of the table 2, there is secured a high speed motor 3. A grinding wheel shaft 3a faces a main spindle (not shown).

On the under surface of the table 2, is secured a hydraulic cylinder 4 and at the rear end of piston 5 of cylinder 4, there is connected shaft 6 and at the other end of shaft 6, a slide-ring is coaxially secured. On the other hand, at the rear end of bed 1, there is provided a perpendicular mounting 8 in which is mounted a motor 9. A drive shaft 10 coaxially and rotatably secured to motor 9 and supported in mounting 8. Drive shaft 10 has a flange 10a at its upper end and a cam shaft 10b is eccentrically mounted integrally with flange 10a.

Mounted on cam shaft 10b is an inner cam 11 having a certain amount of eccentricity between its internal diameter and its external diameter. Externally of inner cam 11 is an outer cam 13 and roller bearings 12 are positioned in the annular space between the surface of the inner cam and the outer cam. Cam 13 is positioned in the interior of slide-ring 7.

Reference numeral 14 indicates an adjustable plate which is mounted on the upper surface of the inner cam 11 and is adapted to hold inner cam 11 against flange 10a by the action of screw 15 which engages with the upper end of cam shaft 10b. Reference numerals 16, 16 adjusting screws which engage with inner cam side 11 and pass through elongated slots 14a being formed on the circumference of the control plate 14 and to make possible regulation of the degree of eccentricity of inner cam 11 in relation to drive shaft 10. Slide-ring 7 is of a generally rectangular shape and on both its sides there is provided a guide rail 7a so that it can undergo a linear reciprocating movement over rollers (not shown) provided on bed 1. In addition, cam follower blocks 17, 18 are provided on the forward and rearward positions of the interior surfaces of slide-ring 7.

Furthermore, the outer cam 13 is provided with receiving apertures 13a one of which is in the forward portion of outer cam 13, and two of which (not shown) are in the rearward portion of outer cam 13. By mounting a needle bearing in each bearing-receiving aperture 13a and securing each one by means of bolt 20 from the upper surface of cam 13 and securing it by means of lock ring 21 at its end, each needle bearing is rotatably retained in a position such that its outer surface projects slightly from the outer peripheral surface of outer cam 11. Thus, the outer surfaces of needle bearings 19 make contact with each cam follower blocks 17, 18 at three points.

Thus, by reason of the above-described construction, when motor 9 is actuated, outer cam 13 reciprocates in accordance with the adjustable degree of eccentricity of inner cam 11.

Figure 5:
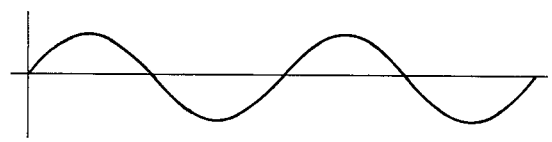
FIG. 5 is a graph showing a movement characteristic of a table reciprocating apparatus embodying features of this invention.
Figure 3:
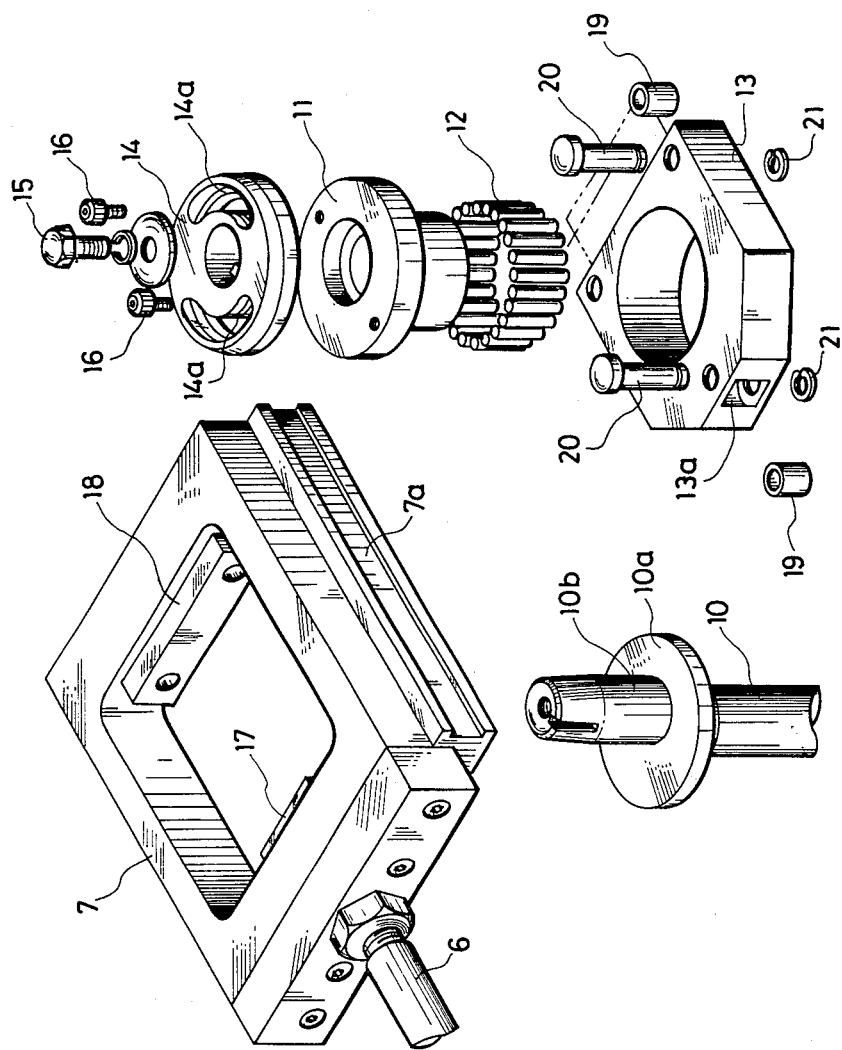
FIG. 3 is an exploded view of the characterizing parts of the invention shown in disassembled state.
Figure 4:
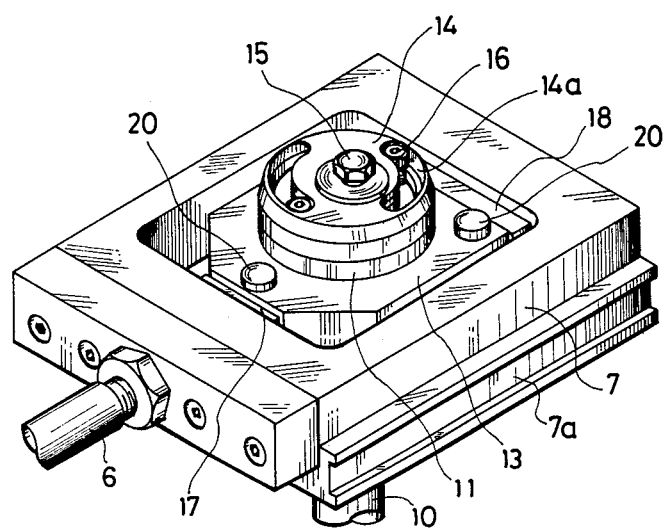
FIG. 4 is a perspective view of the embodiment of FIG. 3 shown in assembled condition.

If a gap should exist between the outer surface of a needle bearing 19 and cam follower blocks 17, 18 it will be extremely small and any shock reduced to such an extent that, as shown in FIG. 5 a smooth movement of reciprocation is realized because only the needle bearing 19 is in contact between outer cam 13 and slide-ring 7.

Thus, any shock is greatly reduced in comparision with conventional cam mechanisms. Moreover, deformation and/or abrasion of the contact surfaces resulting from friction can be reduced by reason of the rotatability of the needle bearings.

What is claimed is:

1. A table-reciprocating apparatus comprising, in combination with a table disposed on a base for reciprocating movement in relation to the base: a shaft axially attached to said table; and a ring-like sliding member attached to the other end of the shaft for imparting reciprocating movement thereto and thereby to the table, said ring-like sliding member having interior surfaces defining an interior space, a drive shaft, and a cam assembly disposed between the drive shaft and the sliding member for controlling the reciprocating movement of said member, said cam assembly comprising an inner cam axially connected to the drive shaft, and an outer cam disposed in the interior space of said ring-like sliding member in co-planar relationship, first bearing means interposed between the inner cam and the outer cam to transmit movement therebetween and second bearing means providing contact between the outer cam and the interior surfaces of the sliding member.

2. A mechanism for imparting reciprocating movement from a rotatable shaft to a linearly-movable reciprocatable member, comprising: a slidable ring-like member attachable during use of said mechanism to said reciprocatable member, said ring-like member having interior surfaces defining an interior space, an inner cam connectable to said shaft during use of the mechanism for rotation with said shaft, an outer cam encircling said inner cam and disposed within said interior space of said ring-like member so as to undergo linear reciprocating movement in response to rotary movement of said inner cam, said inner cam and said outer cam having opposed cooperating surfaces, first bearing means disposed between said cooperating surfaces to transmit the rotary motion of said inner cam to the linear motion of said outer cam, and second bearing means disposed between said outer cam and the interior surfaces of said ring-like member for transmitting the reciprocating movement of said outer cam to said ring-like member.

3. A mechanism as defined in claim 2, wherein said second bearing means comprises needle bearings.

4. A mechanism as defined in claim 3, wherein said second cam has holes in its periphery and said needle bearings are seated in said holes.

5. A mechanism as defined in claim 4, wherein said ring-like member is provided with cam follower means on its interior surfaces for engagement with said needle bearings.

* * * * *